erally employed in the form of a contiguous bed wherein the particles are in contact with surrounding particles.

In a preferred mode of carrying out the process of this invention, an aqueous solution to be treated is passed through a column containing a fluid-permeable granular aggregate of the cross-linked gel polymer. The flow of the solution may be upward or downward. The flow may be actuated by gravity, pumps or application of vacuum. Aggregates of fine-dimensioned polymer granules will generally afford greater absorption efficiency but impose greater resistance to fluid passage than coarse particle aggregates. This is particularly true in the case of polymer having high water absorption. It has been found that, in general, the preferred range of the ratio average granule size/water absorption value is between .002 and .5 wherein average granule size is expressed in inches as determined from a sieving operation using the U.S. Bureau of Standards Screen Series, and the water absorption value is the ratio of wet polymer weight to dry polymer weight. For example, a bed of 270 mesh polymer granules, namely particles which pass through a 270 mesh screen but are retained by the next finer screen, having an average granule size of .0021 inch, provides practical linear flow rate of solution passing therethrough when the water absorption value is below 1. In a bed of granules of 0.1 inch size, the polymer may have a water absorption of 20 with securement of practical fluid permeability and efficient absorption.

Column beds are preferably prepared in such manner as to avoid entrapment of air within the column and to prevent channeling. The polymer granules may be mixed with similarly dimensioned particles of other materials to enhance flow or absorption, or to secure other special effects. In one embodiment of the present invention, the polymer granules are mixed with granules of activated carbon. The advantage of such combination is that, in a solution treating operation wherein both the polymer and carbon have similar absorptive affinities for a chromophoric substance, the polymer gel serves as a visual indicator of the progress of absorption. This permits replacement or regeneration of the absorbent before it saturates with the absorbed solute.

The polymer gel absorbs from aqueous solution many large-molecule organic compounds, especially those containing chromophoric groups or active hydrogen atoms, and also absorbs polyvalent heavy metal cations such as copper, iron, nickel and cobalt, and certain anions. The strength or retentiveness of absorption varies with the specific polymer and specific solute. Many substances, once absorbed, can be removed or eluted from the polymer by treatment of the polymer with large amounts of the pure solvent from which the solute was originally absorbed, or by treatment of the polymer with a different solution. Certain absorbed organic materials may be removed by treatment with permanganate or other oxidant. In this manner, the polymer can in many cases be re-used and the absorbed solute can be recovered free of the polymer gel. In the case of treatments of solutions containing a number of solutes, more than one of which absorbs on the gel, the absorbed solutes can generally be preferentially desorbed via appropriate elution treatment and thereby separated from each other. For example, if both nickel and cobalt are absorbed onto a gel made from nitrilotriacetic acid and ethylene diamine, the cobalt can be separately eluted by flowing a large volume of pure water through the gel. Similarly, if copper and iron are absorbed on the same gel, iron can be eluted with dilute HCl. In multicomponent absorption and elution in a column, the several components may form distinct zones or bands on the column, thus facilitating visual observation and controlled separation.

In other modes of carrying out the process of this invention, the polymer gel in granular form may be slurried with the aqueous solution to be treated, and the mixture separated by filtration, sedimentation, or flotation. In another mode, the gel granules may be enclosed within a porous screen envelope which may then be immersed in a flowing stream of solution to be treated or dragged through a relatively stationary solution. In still another mode, the gel granules may be sintered together to form a self supporting, fluid permeable structure, or the granules may in some other manner be converted into a rigid structure, for example by incorporation within a fluid permeable matrix such as an open sponge or fibrous structure or by co-sintering with another material.

The weight of solute absorbable by the gel is dependent upon the solute, the specific gel, and the conditions of absorption. Some polymer gels can absorb a weight of solute equal to their own weight. Granular polymer aggregates of this invention, containing an absorbed substance can be employed in applications where the polymer serves as a slow release substrate for the absorbate. Thus, the polymer may serve as a carrier for odorants, insecticides, herbicides, bactericides, desiccants, catalysts, oxidant and the like and as a general carrier for liquid compounds which must be utilized in non-liquid form. Metal ions absorbed by the polymer may be reduced to lower valence states by treatment of the granules with reducing agents such as sodium borohydride, sodium hypophosphite and sodium hydrosulfite.

Although not wishing to be bound by theoretical interpretations, it is felt that the unique absorbency characteristics of the cross-linked gel polymer are due to critical effects of hydrogen bonding, dipole interactions, and spatial configuration within the molecular geometry. These factors presumably cause the polymer to exhibit unusual chelation affinities. It is noteworthy that all the polymers contain recurring tertiary amino nitrogen atoms and recurring amide groups. It has also been found that, all other factors being equal, polymers containing alkylene radicals of more than 2 carbons, as may be obtained via use of propylene diamine monomer, lack the necessary gel properties. It is felt that the affinity of the polymer for certain organic compounds is attributable in part to the gel structure which functions to some extent in the manner of a molecular sieve to entrap molecules of certain dimensions.

A further understanding of my invention will be had from a consideration of the following examples which illustrate certain preferred embodiments. All parts and percentages are by weight unless otherwise indicated. Examples A, B and C exemplify methods for the preparation of various polymers which may be employed in the practice of the present invention.

EXAMPLE A

A mixture of 180 parts ethylene diamine and 100 parts distilled water containing 4.5 parts sodium sulfite are slowly added by a dropping funnel to a refluxing solution of 250 parts nitrilotriacetonitrile dissolved in 650 parts of distilled water. The rate of addition is adjusted so as to maintain controlled rapid evolution of ammonia. The system is sealed except for a valve which permits egress of ammonia. Following complete addition of the ethylene diamine solution, the mixture is refluxed for 4½ hours. Water is then removed from the mixture over a 6 hour period by azeotropic distillation with toluene. The temperature rises to about 120° C. and the mixture becomes highly viscous. The flask is cooled slightly and the reaction product, a light yellow rubbery substance, is removed. Upon cooling, it solidifies to a non-brittle yellow glass. The product is purified by leaching in water, whereupon the polymer becomes soft and swollen. Upon drying, the polymer is obtained in brittle form having a pale amber color.

The washed and dried polymer is found to absorb 1.7 times its weight of water when immersed in water at 25° C. The polymer is insoluble in the usual solvents for polymers and does not melt prior to decomposition, thereby confirming the cross-linked nature of the polymer structure. All polymer chain segments, including those which may be considered cross links, have essentially the same chemical configuration, namely a sequence of tertiary amine nitrogen atoms joined by divalent radicals of the formula

The polymer is subjected to a crushing and sieving operation, whereby granular aggregates of various uniform particle sizes from 5 mesh to 50 mesh (U.S. Sieve Series) are obtained.

EXAMPLE B 46.6 parts of nitrilo tripropionic acid are carefully neutralized with 31.2 parts of bis (2 amino ethyl ether in the presence of 40 parts water to provide fluidity to the mixture. The neutralized mixture is then heated at 190° C. for 2 hours under nitrogen to remove water and initiate a polycondensation reaction which forms a polyamide prepolymer. The prepolymer is then dispersed into a high boiling mineral oil, employing a high shear Hobart mixer, with the aid of 2 parts Triton X–100 nonionic surfactant per 50 parts of the prepolymer. The resultant dispersion is heated at 210° C. at a pressure of 4.0 mm. Hg for 4 hours with continuous high shear stirring.

The dispersion is cooled and filtered. The polymer is washed with acetone, dried and sieved. 80% of the polymer granules are found to be within the 60 to 100 mesh range. The granules are spherical. The polymer is cross-linked and absorbs 2.2 times its weight of water to form a soft swollen gel.

EXAMPLE C

A resin reaction flask equipped with heavy duty agitator, vacuum port and external heating mantle is charged with 466 parts of the trimethyl ester of nitrilotriacetic acid, 150 parts ethylene diamine, and 0.1 part zinc acetate catalyst. The mixture is heated with continuous agitation at 180° C. for 3 hours, during which time methanol is continuously removed from the system. Sixty-one parts monoethanol amine are then added and heating at 180° C. is continued for another two hours. Heating is then carried out at 200° C. at a pressure of 23.0 mm. Hg for 3 hours. The resultant polymer is removed from the flask and washed with water. The washed polymer is dried, crushed and sieved. The polymer is found to be cross-linked, and brittle when dry. When immersed in water at 25° C., the polymer absorbs about 14 times its weight of water, becoming a soft swollen gel in so doing. Upon re-drying, the polymer resumes its hard brittle form. The proportions of ingredients employed are such as to cause one out of six of the methyl ester groups of the nitrilotriacetic ester to react with the monoethanolamine, thereby terminating polymer chain growth at said sites of reaction.

EXAMPLE I

Into separate cylindrical glass columns of one inch internal diameter are placed 80 mesh granular aggregates of the polymers of Examples A, B, and C, pre-swollen with water, forming a 12 inch high bed of polymer granules in each column. The columns are provided at the bottom with a 100 mesh screen, which is fine enough to restrict passage of the granules without impeding flow of fluid. Beneath the supporting screen is a ⅜" diameter glass exit tube provided with a stop cock. A dropping funnel is positioned above the column for the controlled addition of solution to be treated.

In a series of experiments, 100 cc. samples of various different aqueous solutions containing about 1% chromophoric organic solute are treated by adjusting the flow rate through the column to 2 cc./minute while maintaining the liquid level in the columns one inch above the granule bed. The progress of absorption is determined visually by observation of the colored bands formed in the amber-colored gel polymers. In each experiment, the test solution is followed by 200 cc. of water to effect partial elution. The solutes studied and results obtained are presented in Table 1. The data under the column "Absorption" indicate the height (in inches) of the absorption band at the top of the column. This is indicative of strength of absorption of the specific solutes since stronger absorption produces smaller band heights.

TABLE 1

| Solute | Absorption | | |
|---|---|---|---|
| | Polymer A | Polymer B | Polymer C |
| Chlorophyl | .7 | 1.1 | .5 |
| Coffee extract | .6 | .9 | .6 |
| Tea extract | .7 | .9 | .6 |
| Tobacco extract | 1.9 | ¹ 1.4 | .5 |
| Molasses | .5 | .7 | .5 |
| Mercurochrome | 1.1 | 1.3 | .8 |
| Grape wine | .4 | .8 | .4 |
| Lignin sulfonic acid (sodium salt) | .6 | 1.1 | .5 |
| Red food color (Maraschino cherry) | .5 | .8 | .5 |
| Picric acid | .6 | 1.2 | .7 |
| Bismark brown | 1.3 | 1.7 | 1.1 |
| Methyl red | .8 | 1.3 | .9 |
| Methyl orange | .9 | 1.2 | .8 |
| Indophenol blue | .9 | 1.5 | 1.0 |
| Fuchsin | 1.7 | 2.3 | 1.2 |

¹ One chromophoric component passes unabsorbed through the polymer bed.

EXAMPLE II

The polymer of Example A in 60 mesh form is utilized in the column of Example I to treat a 100 cc. sample of an aqueous solution containing one percent each of $CuSO_4$, $CoCl_2$, $FeCl_3$, $CrCl_3$ and $NiCl_2$. The sample is added to the column while containing distilled water up to the level of the polymer bed. Following passage of the sample into the polymer bed, the column is eluted with distilled water.

It is found that all the metals except chromium are initially absorbed. Upon elution, the chromium is the first metal obtained in the eluate (or effluent). Cobalt forms a pink band lowermost in the column, preceded by a green band of nickel. With further elution, the cobalt band descends the column and is removed. Nickel follows cobalt down the column, and is separately collected. The iron remains strongly absorbed as a brown band at the top of the column and the copper exists as a greenish blue band immediately below the iron band and partially merged with the iron band.

The eluting water is then made acidic with 2% HCl. The iron is rapidly removed as a band which descends the column. The remaining metal, copper, is then removed by employing as the eluting solution water containing 2% HCl and 2% oxalic acid.

It is thus seen how the process of this invention permits separation of five different metals in a manner which cannot generally be achieved by ion exchange resins.

EXAMPLE III

The polymer of Example C, in 80 mesh size, is placed in the column of Example I to form a bed ten inches high, and a loosely packed wad of cotton is placed above the bed.

An aqueous solution containing about 0.5% of a sodium alkyl aryl sulfonate detergent, about 0.5% of sodium hexametaphosphate, and suspended soil of colloidal size, as obtained from a laundry machine, is passed upward through the bottom of the column at a flow rate of 3 cc./minute. It is observed that the detergent is removed by the polymer and the suspended soil is consequently precipitated out and collected on the cotton wad. The effluent solution still contains the sodium hexametaphosphate, again indicating the unexpected selectivity of the process of this invention.

United States Patent Office 3,580,891
Patented May 25, 1971

3,580,891
WATER-INSOLUBLE, CROSS-LINKED POLYMERIC REACTION PRODUCT OF ETHYLENE DIAMINE AND NITRILOTRIACETIC ACID OR DERIVATIVE
Norman B. Rainer, Richmond, Va., assignor to Seekay Chemical Company, Brooklyn, N.Y.
No Drawing. Filed Apr. 16, 1968, Ser. No. 721,585
Int. Cl. C08g 20/32
U.S. Cl. 260—72         4 Claims

ABSTRACT OF THE DISCLOSURE

A solute is removed from an aqueous solution by contacting said solution with a cross linked polymer containing recurring nitrogen atoms interconnected at each valence by radials of the formula

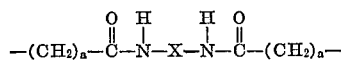

wherein $a$ is 1 or 2 and X is a divalent radical selected from the group —$CH_2CH_2$—, —$CH_2CH_2OCH_2CH_2$— and

BACKGROUND OF THE INVENTION

This invention relates to a novel product and process for the removal of dissolved substances from solutions, and more particularly to a product and process for extracting from an aqueous solution a dissolved substance present in small concentration or present in admixture with one or more other substances.

Classic technique for the recovery of dissolved non-volatile substances from solution generally involve evaporation of the solvent, or physical or chemical conversion of the dissolved substance to an insoluble form. In the case of dilute solutions and solutions containing more than one solute, such recovery techniques are generally unfeasible, particularly in large scale commercial operations. It is known that special absorbents such as ion exchange resins, activated charcoal, molecular sieves and and cross-linked dextrans can be employed for the extraction of dissolved substances from solutions. However, said absorbents have very specific affinities for solutes and cannot be employed beyond a limited range of applications. Certain absorbents lack sufficiently specific affinities to distinguish between similar solutes. For example, conventional ion exchange resins will generally act upon all similarly charged ions in a given solution. Activated charcoal, although effective in removing chromophoric organic compounds from solution, is generally ineffective in absorbing inorganic species, whether chromophoric or not, and does not permit visual observation of the rate or extent of absorption of chromophoric substances. Molecular sieves and inorganic zeolites are similarly limited in utility to operations such as removal of volatile impurities from solvents, or exchange of sodium ions for calcium ions in water purification. Dextrans, though useful in many separations of dissolved substances, have limited specific affinities for solutes, and are subject to bactericidal and fungicidal attack.

SUMMARY OF THE INVENTION

It is an object of the present invention to provide a process for the removal of substances from aqueous solutions.

It is another object to provide a non-evaporative process for extracting non-volatile dissolved substances from dilute aqueous solutions.

It is a still further object of the present invention to provide a non-evaporative process for selectively extracting from aqueous solutions non-volatile organic or inorganic solutes present in small concentration or in admixture with other solutes, said process permitting visual observation of the rate of removal of chromophoric solutes.

It is still another object of this invention to provide a product useful for the removal of dissolved substances from aqueous solutions. Other objects and advantages will appear hereinafter.

The objects of the present invention are accomplished in general by contacting an aqueous solution containing a dissolved substance with a cross-linked polymer containing recurring nitrogen atoms interconnected at each valence by radicals of the formula:

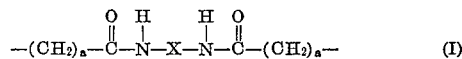    (I)

wherein $a$ is 1 or 2, and X is a divalent radical selected from the group consisting of —$CH_2CH_2$—,

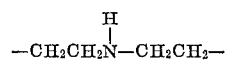

and —$CH_2CH_2OCH_2CH_2$—, permitting absorption of said dissolved substance by said polymer, and separating said polymer from the solution thus treated. The product of the present invention comprises a fluid-permeable granular aggregate of the above-identified cross-linked polymer.

Solutions amenable to treatment via the process of this invention may contain water as the sole solvent or may contain in admixture with the water up to 70% of a water-miscible organic liquid containing active hydrogen atoms as determinable by the Zerewitinoff test. Suitable organic liquids include low molecular weight alcohols, amines, and carboxylic acids. Other ingredients may also be present to enhance the activity of the solvent toward dissolving the solute. The solution may have any pH, although the pH range of 2 to 9 is found preferable. Acidic solutions generally cause greater swelling of the polymer with attendant increased absorption efficiency. The temperature of the solution being treated may range from about 5° C. to about 120° C. although greater efficiencies of treatment are generally obtained at temperatures in range of 20° C. to 90° C.

The solute may be a substance which in its pure form is liquid or solid at room temperature, and may be organic or inorganic. In preferred embodiments of this invention, the substance removed from solution is a non-volatile solute, namely a material having a higher boiling point than water and which cannot be removed from the aqueous solution by fractional distillation wherein the solute distills prior to distillation of the water. In the case of solutions containing only one non-volatile solute which is absorbed by the polymer, the process of the present invention is most economically applicable to dilute solutions, i.e. solutions containing less than 5% by weight of said solute. In the case of solutions containing a mixture of solutes, only one of which is selectively removed by the polymer, the process of this invention is practical at concentrations of said removable solute up to about 10%. In general, however, the process is useful to greater advantage with extremely dilute solutions having absorbable solute concentrations below about 2%. In certain applications the substance removed from solution may be the water, in which case the process of this invention serves to dry water-miscible organic liquids.

The polymers useful in the practice of the present invention have gel characteristics. When dry, they are brittle, non-crystalline glassy solids. They absorb over 70% of their weight of water when immersed in water at room temperature, forming a swollen soft resilient but non-flowable structure. Upon drying, the swollen structure resumes the original brittle form. The degree of water absorption (or water absorption value) may range to 20 times the dry weight of the polymer; however, the preferred range of water absorption is between 1 and 15 times the dry weight of polymer. A water absorption value below 1 provides relatively poor solute affinity, and a water absorption value above 15 yields polymers which, in the swollen state have weak cohesive strength and are susceptible to disintegration. The degree of water absorption propensity of the polymer is dependent upon its composition, extent of cross-linking, and molecular weight. In general, the degree of water absorption increases with decreased cross-linking, decreased molecular weight, and increased nitrogen to carbon ratio, e.g. polymers wherein $a$ equals 1.

The polymers employed in this invention may be represented by the generalized formula:

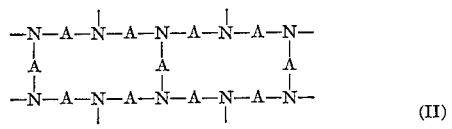

(II)

wherein A is the divalent radical of Formula I above, and the free valences continue the bond sequence shown. However, within the purview of operable polymers contemplated by the present invention are polymers wherein up to 35% of the A radicals are replaced by hydrogen or monovalent amidic radicals of the formulas:

$$-(CH_2)_a CONHCH_3$$
$$-(CH_2)_a CON(CH_3)_2$$
$$-(CH_2)_a CONHCH_2CH_2OH$$
$$-(CH_2)_a CON(CH_2CH_2OH)_2$$

and $$-(CH_2)_a CNHNOH$$

wherein $a$ is 1 or 2. The terminal groups of the polymer consist of partially reacted monomers from which the polymer was made, or the aforementioned monovalent amidic radicals.

The polymers described hereinabove may be prepared by reacting a diprimary amine selected from the group consisting of ethylene diamine, diethylene triamine, bis (2-aminoethyl) ether and mixtures thereof with a trifunctional monomer selected from the group consisting of nitrilotriacetic acid, nitrilotripropionic acid and amine-reactive derivatives of said acids such as the corresponding lower alkyl esters, nitriles and acid halides. Modifying co-reactants, which may be added in amounts up to 35% by weight of the polymer, include iminodiacetic acid, iminodipropionic acid, methyl amine, dimethyl amine, hydroxylamine, ethanol amine and diethanol amine. Said modifying co-reactants replace a certain portion of the divalent A radicals, as previously mentioned.

The polymerization reaction can be carried out by heating a stoichiometric mixture of the selected monomers at temperatures in the range of 80° C. to 250° C. under conditions which enhance removal of the volatile condensation by-product and thereby facilitate propagation of the polymerization reaction. The duration of heating may be from half an hour to about twenty hours. The molecular weight of the polymer may be controlled either by the duration of heating or by the inclusion in the monomer mixture of carefully measured amounts of polymer terminating agents. Said terminating agents are compounds which are monofunctional with respect to the polymer-forming reaction, and react with an active functional group of the monomer or polymer to prevent further chain growth at the site of its reaction. Suitable terminating agents, which may be employed generally in amounts of less than 2 mole percent, include for example acetic acid, morpholine, ethyl amine, and the like. Other than to control molecular weight, the terminating agents have little effect on the polymer, and thus are to be distinguished from the monofunctional modifying co-reactants mentioned supra. The polymer molecular weight may be ascertained by viscosity measurements; and such measurements may be employed on an empirical basis to secure reproducibility in subsequent production of the same polymer.

The polymers may in general be prepared by standard techniques for the production of polyamides. When the diacid-diamine system is used, a monomer salt can first be formed and utilized for the polymerization. When a lower alkyl ester of the acid monomer is used, catalysts commonly effective in promoting aminolysis reactions may be employed, typical catalysts being compounds of heavy metals such as zinc, tin and antimony. When a nitrile counterpart of either nitrilo acid is employed in the polymerization reaction, some water must be included with the monomers to facilitate hydrolysis of the nitrile and the splitting out of ammonia as the condensation by-product. The polymerization reaction should be carried out in the absence of oxygen so as to minimize discoloration. The use of oxygen absorbing compounds such as sulfites may further minimize discoloration. Faster reaction rates can be obtained with increased agitation, creation of increased surface area of the reacting mixture, and application of vacuum to assist removal of the volatile condensation by-product. In certain cases when employing ethylene diamine as a monomer, it may be desirable to slowly add the ethylene diamine to an excess of the nitrilo monomer under polymerization conditions so as to minimize the potential formation of imidazolines.

Various water-insoluble substances which may modify absorption characteristics can be added to the still fluid polymerization mixture and thereby become uniformly and retentively incorporated within the polymer. Such additives include: finely divided activated carbon, silica gel, zeolites, alumina, and thermally stable substances generally employed in gas or liquid column chromatography techniques.

The polymers are generally of light amber color. The polymer in dry condition can be comminuted and sieved to obtain an aggregate of desired average particle size. Alternatively, polymer may be produced in a selected granule size by carrying out the polymerization in the dispersed phase of a heterogeneous fluid system. For example, the condensation polymerization may be carried out on a monomer mixture or prepolymer emulsified in a high boiling, chemically inert fluid such as diphenyl or hydrocarbon oil or wax. Polymer granules produced via emulsion polymerization are generally spherical in shape and preferable for most applications.

The polymer may be chemically treated subsequent to its formation to modify its absorption affinity. For example, a polymer made from nitrilotriacetic acid and ethylene diamine ordinarily absorbs iron more strongly than copper. If however said polymer is first treated with hypochlorous acid, it then absorbs copper more strongly than iron. Suitable chemical treatments include reactions which effect substitution of the hydrogen attached to the amidic nitrogen atoms of the polymer, such reactions including treatment of the polymer with reagents such as nitric oxide, hypohalous acids, formaldehyde, and ethylene oxide, and reactions which modify tertiary amino nitrogen atoms, such reactions including treatment of the polymer with strong inorganic acids, hydrogen peroxide, and quaternizing agents.

The polymer may be employed in the form of granules ranging in size from 10 microns to one-half inch in diameter. In any given aggregate of said granules there should preferably be less than 25% by weight of granules having a diameter deviating more than five-fold from the mean granule diameter, since excessive particle size distribution gives rise to sedimentation effects and impedes fluid flow through a bed of said aggregate. The aggregate is gen-

EXAMPLE IV

Fifteen gallons of ocean water taken from the Atlantic Ocean near New York city are filtered and evaporated in a ceramic vessel to a volume of one gallon. The concentrated solution is passed through a ⅜" inside diameter tube containing a 2 inch high bed of polymer of Example A in 60 mesh size. The flow rate is 2 cc./minute.

The polymer turns brown. Upon washing with 2 liters of distilled water, the brown color remains undisturbed. The column is then eluted with 200 cc. of 4% HCl. The eluate is made basic with ammonium hydroxide and evaporated to dryness, yielding .15 milligram of ferric oxide, an amount which appears to represent quantitative recovery of the iron content of the ocean water.

It is important to note in connection with this experiment that the massive amounts of sodium, calcium and magnesium salts present in the water did not interefere with the recovery of iron, as would have been the case with an ion exchange resin. The concentrated ocean water employed in this example roughly approximates the residue of desalination processes which operate on the principle of evaporation.

EXAMPLE V

Two identical columns are prepared, as in Example I, employing the polymer of Example A. To one column there is added 100 cc. of a solution of 2% $CuCl_2$ and 2% $FeCl_3$ in distilled water. Both the copper and iron are strongly absorbed within 1.6 inches of the top of the column. To the second column there is added 100 cc. of a solution of about 2% hypochlorous acid in water. This is eluted with water until the eluant no longer gives a positive test to starch-iodide paper. To the column thus treated is then added the same $CuCl_2/FeCl_3$ solution employed on the first column. It is observed that the iron passes through the column while the copper is still strongly absorbed, thereby illustrating the modifications in affinities of the polymer obtainable via treatments of the polymer with reagents which are reactive with the amidic nitrogen atoms of the polymer.

EXAMPLE VI

To a solution constisting of 30 parts water and 70 parts acetone there is added 5 parts of the polymer of Example C in 40–80 mesh granule size. The mixture is slurried and allowed to stand 2 hours at 30° C. The granules expand as they absorb from the solution water, which in this situation may be considered to be a solute. The liquid is decanted off and is found to contain less than 1% water. The granules are dried in an oven at 50° C. whereupon they resume their compact, brittle form, and as such are ready for reuse in subsequent drying or other applications.

EXAMPLE VII

Employing the process of Example B, a cross-linked polymer is made from 46.6 parts nitrilotripropionic acid, 26.0 parts bis (2 amino ethyl) ether and 4.5 parts dimethyl amine. The polymer product, in the form of dry 40–80 mesh granules is placed in a reaction flask with twice its weight of dimethyl sulfate quaternizing agent. The mixture of polymer and dimethyl sulfate is heated at 180° C. with agitation for 4 hours. The polymer is separated from the dimethyl sulfate, thoroughly washed with ethanol, and dried.

The polymer thus treated is placed in a column in the manner of Example I. A 10% sodium chloride solution is passed through the column until the eluant gives a positive test for chloride ion. The column is then washed with distilled water until no further trace of chloride ion is found in the effluent solution. A 5% aqueous solution of sodium phosphate is then passed through the column at a flow rate of 3 cc./minute. Chloride ion in amounts equivalent to the phosphate inflow are detected in the effluent. This phenomenon establishes that the treated polymer possesses anion exchange properties.

EXAMPLE VIII

Sixty parts of 50–80 mesh cellulose acetate polymer granules are dry blended with 40 parts of 50–80 mesh granules of a gel polymer made via the process of Example C from 466 parts trimethylester of nitrilotriacetic acid, 150 parts ethylene diamine, and 105 parts diethanol amine. To the mixture of polymer granules, a solution of 50 parts acetone and 50 parts water is slowly added with stirring to obtain a mixture of paste-like consistency. The paste is placed in a partially sealed flask and heated in an oven at 80° C. until the paste is dry. The composition at this point is a rigid porous structure wherein the cellulose acetate granules are interconnected, leaving channels therebetween and entrapping the granules of the cross-linked gel polymer within the cellulose acetate matrix.

The rigid porous structure is immersed in a 1% solution of chlorophyl in water. The chlorophyl is absorbed by the porous structure, indicating that the absorption characteristics of the gel polymer are not adversely affected by incorporation within the fluid permeable cellulose acetate matrix.

EXAMPLE IX

A column is prepared as in Example I from a uniform blend of equal parts by weight of 80 mesh Darco activated carbon and 80 mesh polymer granules of Examples A. An aqueous darkly colored molasses solution is entered into the top of the column. The progress of absorption of the chromophoric constituents by the column is visibly discernible as a dark band which contrasts with the less darkly colored aggregate bed beneath it in the column. Such visual observation permits more efficient use of activated carbon since it facilitates complete utilization of the carbon without endangering oversaturation of the carbon with attendant passage of improperly decolorized solution.

EXAMPLE X

A sample of aniline containing darkly colored impurities from air oxidation is dissolved in a mixture of 50 parts water and 50 parts acetic acid, to form a solution containing about 15% of the aniline. The solution is passed through a column containing 30–50 mesh granules of gel polymer having a water absorption value of 3.5 made via the process of Example A by reacting a mixture of 150 parts ethylene diamine and 61 parts monoethanol amine with 268 parts nitrilotriacetonitrile. The chromophoric ingredients are absorbed by the column. The sample is eluted with water. The effluent solution is adjusted to pH 8.5 with sodium hydroxide and distilled to recover pure aniline.

EXAMPLE XI

To demonstrate the effect of granule size distribution in the polymer aggregates of this invention, two columns are prepared from granules of polymer of Example A, one column containing 50 mesh granules, the other column containing a mixture of 50% by weight 170 mesh granules and 50% by weight 35 mesh granules.

It is found that, over a series of throughput pressures, water flows as much as 45% faster through the 50 mesh granule column than through the mixed granule column. In the course of continued use, the mixed mesh column develops increased resistance to flow, apparently because the 170 mesh particles tend to stratify within lower regions of the column.

Since the resistance to passage of fluid through a bed of granules is in general proportional to the average granule size, it would have been expected that the column having the mixed size granules would exhibit a flow rate comparable to the column of uniform 50 mesh (0.297 mm.) granules which have a size roughly halfway between 35 mesh (0.50 mm.) and 170 mesh (0.088 mm.). The result of the experiment, opposite to what might have been expected, emphasizes the criticality of the specified uniformity of granule size in the aggregates of this invention.

EXAMPLE XII

To a refluxing mixture of 268 grams nitrilotriacetonitrile and 300 cc. water in a resin reaction flask there is slowly added over a 2 hour period 132 grams of ethylene diamine. Refluxing is continued with removal of by-product ammonia until the mixture assumes a thick, syrupy consistency. The mixture is stirred with a paddle blade mixer operating at 55 r.p.m., and 52.8 grams hydroxylamine are slowly added over a 2 hour period while maintaining the mixture at a temperature of 80° C. The mixture is then poured into a beaker and maintained at 80° C. under a blanket of nitrogen until evaporation of water ceases and the mixture solidifies.

The solidified product is crushed and sieved to obtain a 10–30 mesh product which is then washed with water and dried. The polymer is cross-linked and has a pale amber color. It absorbs about 9.5 times its weight of water at 30° C. The polymer contains amidoxime groups of the formula:

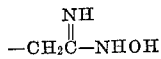

Based upon the ratio of monomer reactants employed, the polymer contains about 17% by weight of such amidoxime groups.

The polymer of this example demonstrates exceptionally high affinity for traces of nickel salts in aqueous solutions, and is particularly effective in the selective recovery of nickel from waste electroplating solutions.

EXAMPLE XIII

A column is prepared, as described in Example I, employing the polymer of Example A in 30 mesh size. The column is washed with one liter of water. There is then added to the column 25 cc. of an aqueous solution of 3% potassium dichromate and 3% sodium chloride. The flow rate is adjusted to 2 cc./minute. A red band of absorbed dichromate anion forms at the top of the column. The effluent is colorless and contains sodium, potassium and chloride ions. The column is then washed with 500 cc. of distilled water without effect on the absorbed dichromate band. Elution is carried out by adding 300 cc. of ammonium hydroxide to the column, which appears to achieve quantitative removal of the dichromate.

The column is washed successively with 500 cc. water, 500 cc. 5% acetic acid, and 500 cc. water. The absorption experiment of this example is then repeated, establishing that the polymer can be recycled for repeated use in this application.

The granular polymer aggregate of the present invention has further utility in applications which are not entirely dependent upon the unusual absorption characteristics of the polymer. For example, the water-swollen granules may be mixed with substances which require a controlled amount of water to achieve a desired chemical or physical modification. When added to portland cement prior to curing, the granules effect a controlled curing and yield a structure of lower density having undiminished strength. Special lubricating effects may be achieved, particularly when the granules have a dry size small enough to enter the voids or fissures in the surface of a solid substrate. Thus, the dry powdered polymer may be applied to concrete or asphalt pavements and then wetted with water to form surfaces so slippery as to make pedestrian or vehicular traffic impossible. Such application is of interest in certain aspects of riot control and military operations.

The invention has been described in detail with particular reference to preferred embodiments thereof, but it will be understood that variations and modifications can be effected within the spirit and scope of the invention as described hereinabove and as defined in the appended claims.

I claim:

1. A fluid-permeable aggregate of granules of a water-insoluble cross-linked polymer consisting substantially of the reaction product of ethylene diamine and a member selected from the group consisting of nitrilotriacetic acid, nitrilotriacetonitrile, and lower alkyl esters of nitrilotriacetic acid, said polymer being capable of absorbing between 0.7 and 20 times its weight of water and having absorptive affinity for polyvalent metal ions.

2. A fluid-permeable aggregate of granules of a water-insoluble cross-linked polymer produced by the reaction of ethylene diamine with (1) a member selected from the group consisting of nitrilotriacetic acid, nitrilotriacetonitrile, and lower alkyl esters of nitrilotriacetic acid, and (2) up to 35% by weight of the resulting polymer of a modifying co-reactant which forms monovalent amidic radicals, said polymer being capable of absorbing between 0.7 and 20 times its weight of water and having absorptive affinity for polyvalent metal ions.

3. The granules of claim 1, chemically modified by treatment with a reagent selected from the group consisting of nitric oxide, hypohalous acids, formaldehyde, and ethylene oxide which react with the amidic nitrogen atoms of said polymer.

4. Granules of claim 1 wherein said polymer has a gel structure and is capable of absorbing between 0.7 and 20 times its weight of water.

References Cited

UNITED STATES PATENTS 3,513,127   5/1970   Marans _____ 260—77
3,515,747   6/1970   Marans _____ 260—78

HAROLD D. ANDERSON, Primary Examiner

U.S. Cl. X.R.

210—37, 38; 260—2.1, 2.2, 37, 78